United States Patent [19]

Toyoda et al.

[11] Patent Number: 4,857,700

[45] Date of Patent: Aug. 15, 1989

[54] CONTROL APPARATUS FOR AUTOMATIC ARC WELDING MACHINE

[75] Inventors: Kenichi Toyoda; Tohru Mizuno; Nobutoshi Torii; Yuichi Kanda, all of Tokyo; Shigehiro Morikawa, Atsugi, all of Japan

[73] Assignee: Fanuc Ltd., Yamanashi, Japan

[21] Appl. No.: 243,564

[22] PCT Filed: Nov. 5, 1987

[86] PCT No.: PCT/JP87/00854
§ 371 Date: Aug. 9, 1988
§ 102(e) Date: Aug. 9, 1988

[87] PCT Pub. No.: WO88/04971
PCT Pub. Date: Jul. 14, 1988

[30] Foreign Application Priority Data

Dec. 27, 1986 [JP] Japan .................. 61-309258

[51] Int. Cl.$^4$ .............................. B23K 9/12
[52] U.S. Cl. .................. 219/124.34; 219/124.22; 219/125.12
[58] Field of Search ............ 219/124.22, 124.34, 219/125.12

[56] References Cited

U.S. PATENT DOCUMENTS 4,587,398 5/1986 Sarugaku et al. ............. 219/124.22
4,658,112 4/1987 Thompson .................... 219/124.22
4,704,513 11/1987 Sugitani et al. ............... 219/124.22

FOREIGN PATENT DOCUMENTS 59-156577 9/1984 Japan .
61-17590 5/1986 Japan .

Primary Examiner—Clifford C. Shaw
Attorney, Agent, or Firm—Armstrong, Nikaido, Marmelstein, Kubovcik & Murray

[57] ABSTRACT

The arc current is divided into two areas each corresponding to a ¼ period of weaving, the two areas are compared with each other, and an area corresponding to a predetermined time period at the end portion of the larger area is subtracted from the larger area and another area comparison is performed. The movement of the welding torch is compensated in accordance with the predetermined correction function, so that, even when an actual weld line of base metals to be welded deviates from an instructed weld line, the welding torch is correctly moved along the weld line of the base materials and arc welding is performed.

6 Claims, 5 Drawing Sheets

CONTROL APPARATUS FOR AUTOMATIC ARC WELDING MACHINE

TECHNICAL FIELD

The present invention relates to a control apparatus for an automatic arc welding machine, more particularly, to a control apparatus for an automatic arc welding machine for automatically performing arc welding by weaving a welding torch along a weld line, using an arc sensor to detect an arc current caused by the weaving, and compensating movement of the welding torch.

BACKGROUND ART

In automatic arc welding a welding torch is made to weave along the weld line of base metals to be welded, and simultaneously, an arc current caused by the weaving is detected by an arc sensor to compensate movement of the welding torch, and thereby the weld line of the base metals is automatically arc welded. More specifically, when the actual weld line of the base metals to be welded deviates from an instructed weld line, the arc current is detected by the arc sensor and processed and thereby the movement of the welding torch is compensated to correctly move the welding torch along the actual weld line.

In the processing of an arc current of a conventional control apparatus for an automatic arc welding machine, for example, the position, amplitude, and the like of an arc current detected by the arc sensor are monitored, and welding torch is moved for a predetermined distance in accordance with the peak value of the monitored position, amplitude, and the like, and as a result, the welding torch is moved along the actual weld line of the base metals.

An arc current detected by an arc sensor has an unstable waveform because of disturbances occurring during arc welding and the like. In particular, although the peak value of the ac current is processed by smoothing the current waveform thereof through a filter or the like, a change in the arc current caused by a deviation of the welding torch from the weld line of the base metals cannot be easily discriminated from a change in the arc current caused by a disturbance or the like. Furthermore, a peak can occur in an arc current due to factors other than a deviation of the welding torch from the weld line, and as a result, an overcompensation of the movement of the welding torch occurs.

DISCLOSURE OF THE INVENTION

The object of the present invention is to correctly move the welding torch along the weld line of the base metals, and to perform arc welding even when an actual weld line of base metals to be welded deviates from an instructed weld line.

According to the present invention, there is provided a control apparatus for an automatic arc welding machine for automatically performing arc welding by weaving a welding torch along a weld line, using an arc sensor to detect an arc current caused by the weaving, and compensating movement of the welding torch, characterized in that the control apparatus comprises: an area calculating device for detecting the arc current at every half period of the welding, and integrating the arc current on a time basis to calculate two areas each corresponding to a ¼ period, a first area comparing discriminating device for comparing the two areas and discriminating between a first large area and a second small area, a second area comparing discriminating device for calculating a first correction area by subtracting a predetermined area from the first area, the predetermined area corresponding to a predetermined time period at an end portion of the first area, and comparing the first correction area with the second area, and a movement compensating device for correcting a reference value by using a correction function to compensate movement of the welding torch when the first correction area is larger than the second area.

With the control apparatus for the automatic arc welding machine according to the present invention having the arrangement described above, the welding torch is caused to weave along the weld line to perform an automatic arc welding, an arc current caused by the weaving is detected by an arc sensor, and movement of the welding torch is compensated. The arc current detected at every half period of the weaving is integrated on a time basis by the area calculating device to calculate two areas each corresponding to a ¼ period. The two areas are compared by the first area comparing discriminating device to discriminate between a first large area and a second small area. A first correction area is obtained by subtracting, from the first area, a predetermined area corresponding to a predetermined time period at the end portion of the first area. The first correction area is compared with the second area by the second area comparing discriminating device. When the first correction area is larger than the second area, the reference value is corrected by the movement compensating device by using the correction function, thereby compensating the movement of the welding torch. As a result, even when an actual weld line of base metals to be welded deviates from an instructed weld line, the welding torch is correctly moved along the weld line of the base metals and arc welding is performed.

BEST MODE FOR CARRYING OUT THE INVENTION

Figure 1:
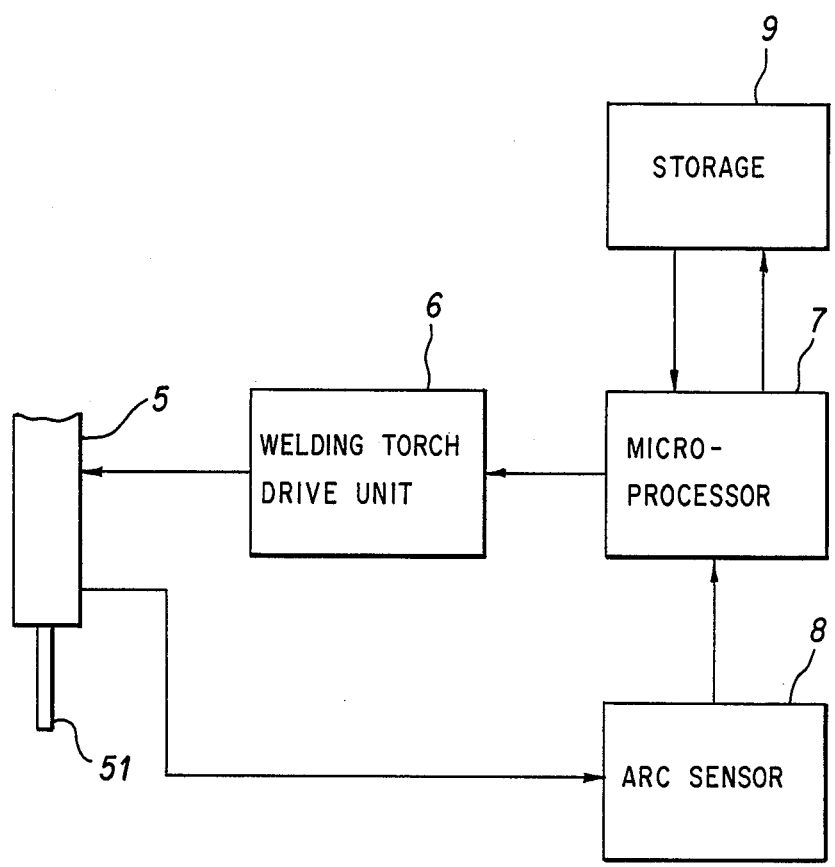
FIG. 1 is a schematic block diagram showing an embodiment of a control apparatus for an automatic arc welding machine according to the present invention.

A control apparatus for an automatic arc welding machine according to an embodiment of the present invention will be described with reference to the accompanying drawings FIG. 1 is a schematic block diagram showing an embodiment of a control apparatus for an automatic arc welding machine according to the present invention.

A welding torch 5 is used to arc-weld base metals while supplying a welding wire 51, and when a voltage is applied to the welding torch 5 by a welding power source (not shown), an arc is generated between the distal end of the welding wire 51 and the base metals. The arc current flowing between the distal end of the welding wire 51 and the base metals is measured by an arc sensor 8, data of the arc current is supplied to a microprocessor 7, and the welding torch 5 is controlled by a welding torch drive unit 6 operated by commands from the microprocessor 7. As a result, the welding torch 5 is caused to move and weave along the weld line of the base metals by the welding torch drive unit 6. A memory 9 stores a correction function and the like, and upon reception of a command from the microprocessor 7, the memory 9 supplies stored data, such as the correction function, to the microprocessor 7.

Figure 2:
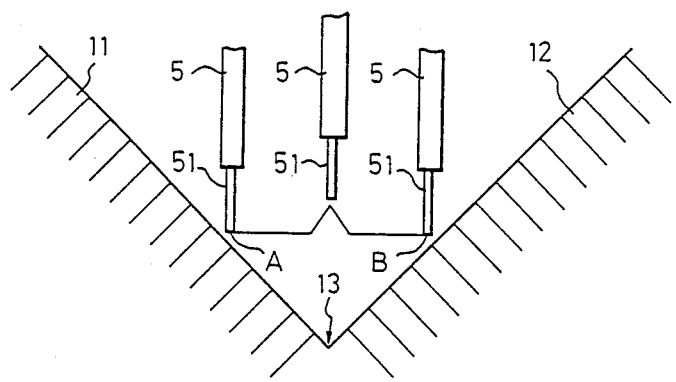
FIG. 2 is a diagram for explaining the weaving operation of the welding torch.
Figure 3:
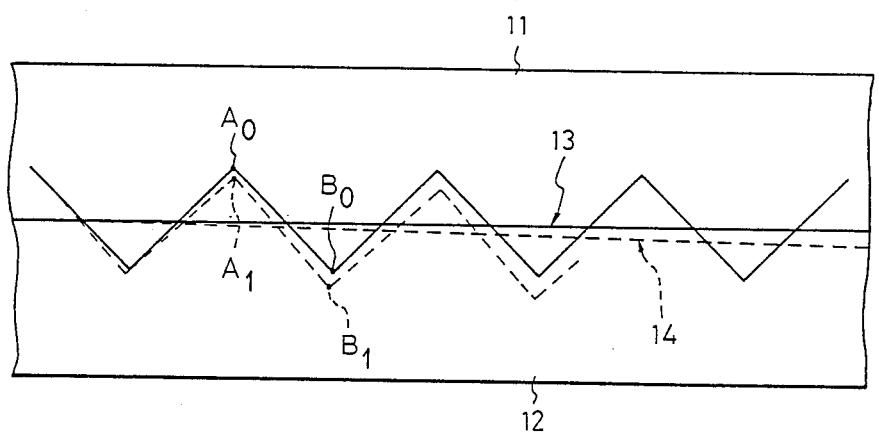
FIG. 3 is a diagram showing the relationship between the weld line of the base metals to be welded and weaving of the welding torch.

FIG. 2 is a diagram for explaining the weaving operation of the welding torch, and FIG. 3 is a diagram showing the relationship between the weld line of the base metals to be welded and weaving of the welding torch.

As shown in FIGS. 2 and 3, for example, when members 11 and 12 arranged in a V-shaped manner are to be arc-welded, the welding torch 5 weaves along a weld line 13. The weaving operation of the welding torch 13 is made by not only a horizontal zigzag movement but also by a vertical movement According to this vertical movement, the welding torch 5 is raised high above the weld line 13. The waveform of the arc current detected by the arc sensor 8 is changed by a weaving operation to control the welding torch 5, and at the same time, arc welding of the members 11 and 12 is reliably performed.

The welding wire 51 is sequentially and continuously supplied from a central portion of the welding torch 5, and an arc discharge is caused between the distal end of the welding wire 51 and the member 11 or 12. The welding wire 51 is melted by the heat accompanying the arc discharge, to thereby weld the members 11 and 12.

Figure 4A:
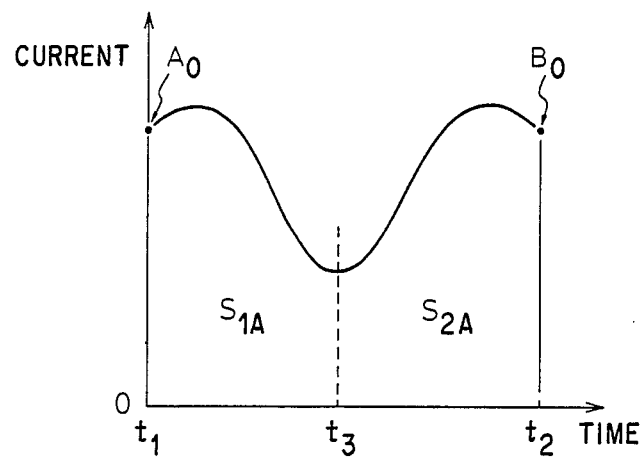
FIGS. 4(a) and 4(b) are graphs of the arc current of FIG. 3.
Figure 4B:
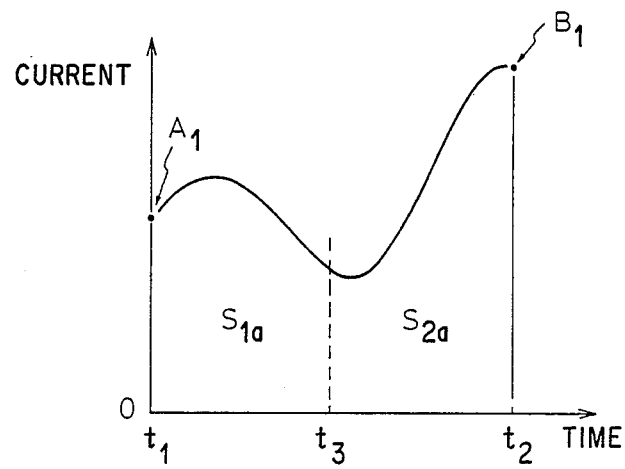

FIGS. 4(a) and 4(b) are graphs of the arc current of FIG. 3, in which FIG. 4(a) shows a waveform obtained when the welding torch 5 moves from one end $A_O$ to the other end $B_O$ of the weaving of FIG. 3 and FIG. 4(b) shows a waveform obtained when the welding torch 5 moves from one end $A_1$ to the other end $B_1$ of the weaving of FIG. 3.

As shown in FIG. 4(a), when the actual weld line 13 coincides with the instructed weld line and weaving of the welding torch 5 is correctly performed, the waveform of the arc current becomes symmetrical. More specifically, the waveform of the arc current is minimum at a center time point $T_3$ between a time point $T_1$ corresponding to one end $A_O$ of weaving and a time point $T_2$ corresponding to the other end $B_O$ of weaving, and areas $S_{1A}$ and $S_{2A}$ are equal to each other.

As shown in FIG. 4(b), when the actual weld line 13 is deviated from the instructed welding line 14, the waveform of the arc current is not minimum at the center time point $T_3$ between the time point $t_1$ corresponding to one end $A_1$ of weaving and the time point $t_2$ corresponding to the other end $B_1$ of weaving, and areas $S_{1a}$ and $S_{2a}$ are different from each other. The arc current changes as shown in FIG. 4(b) when the welding torch 5 deviates so that it is separated from the member 11 at one end $A_1$ and close to the member 12 at the other end $B_1$.

Figure 5A:
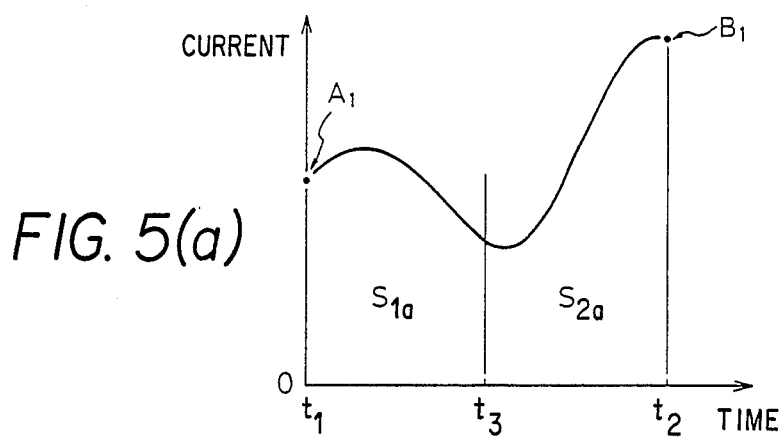
FIGS. 5(a) and 5(c) are graphs for explaining the movement compensation processing of the welding torch when the arc current shown in FIG. 4(b) is detected.
Figure 5B:
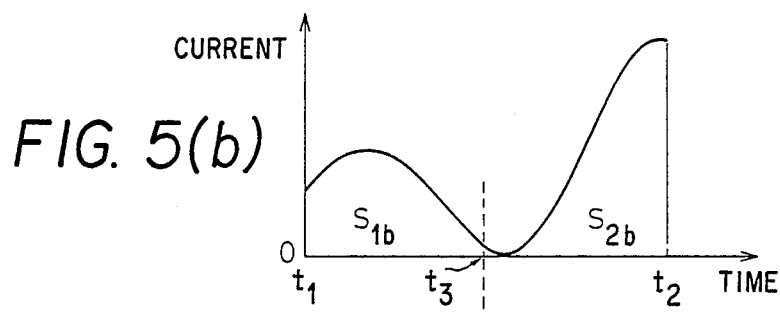
Figure 5C:
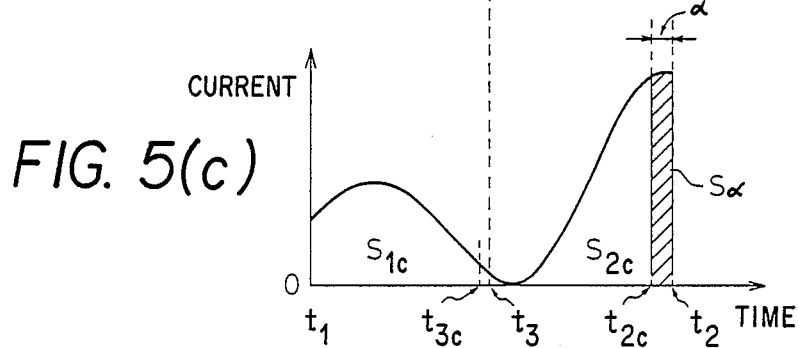
Figure 6:
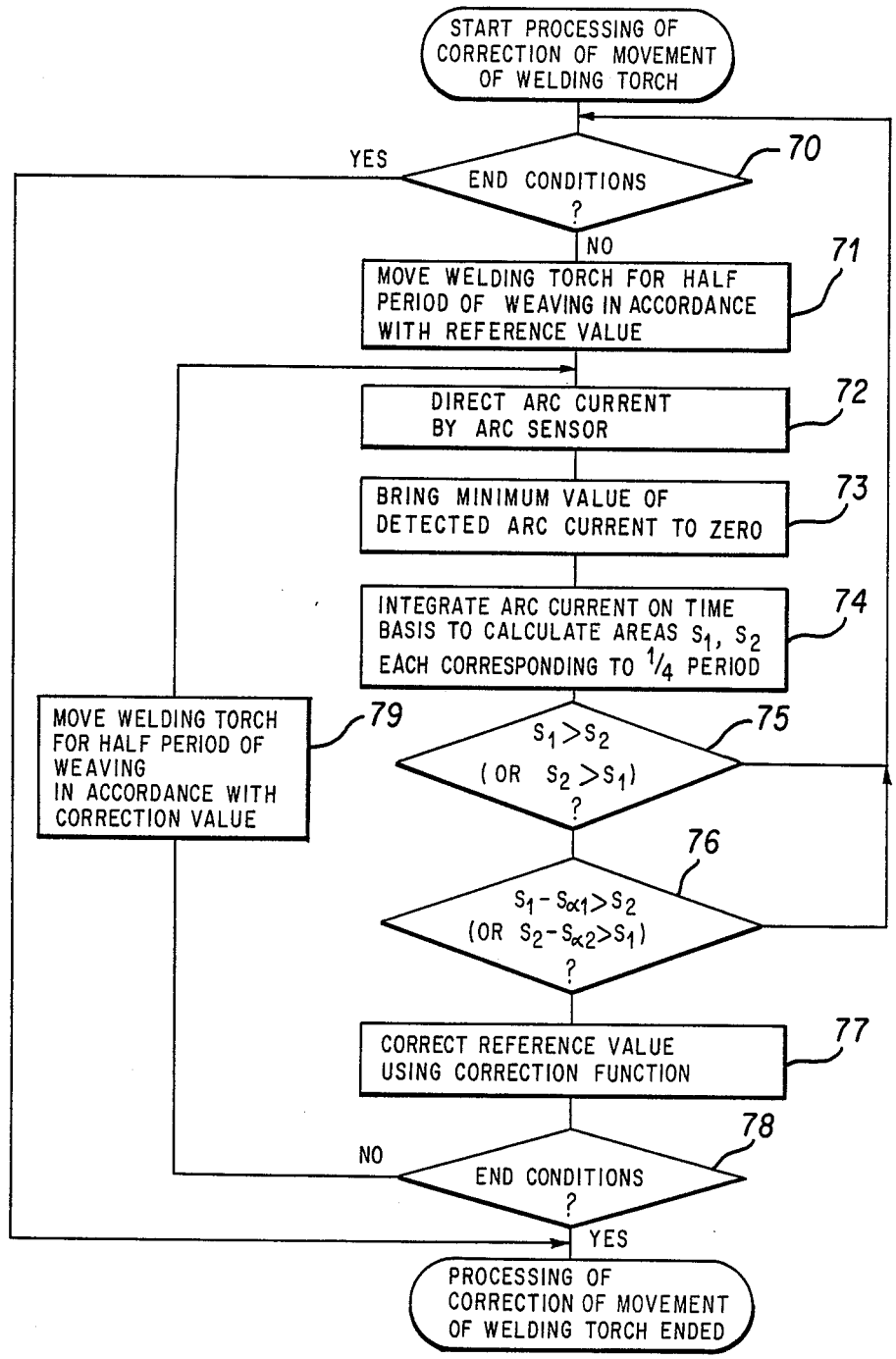
FIG. 6 is a flowchart showing an example of the control operation based on the present invention.

FIGS. 5(a) to 5(c) are graphs for explaining the movement compensation processing of the welding torch when the arc current shown in FIG. 4(b) is detected. FIG. 6 is a flowchart of an example of the control operation according to the present invention.

An example of the operation of the control apparatus for the automatic arc welding machine according to the present invention will be described with reference to FIGS. 5 and 6.

When the processing of the correction of movement of the welding torch is started, in step 70 it is determined whether the end conditions are satisfied. The end conditions include, for example, the length of the welding line previously input. If YES in step 70, the processing of the correction of movement of the welding torch is ended.

In NO in step 70, the flow advances to step 71 to move the welding torch 5 for the half period of weaving in accordance with a reference value, and the flow then goes to step 72 to detect the arc current. Note that, when the welding torch 5 is moved for the half period of weaving in accordance with the reference value, it is moved along the instructed weld line. The reference value is stored in the memory 9 or the like.

When the arc current is detected by the arc sensor 8 in step 72, the minimum value of the detected arc current is set at 0 in step 73, as shown in FIG. 5(b). The arc current is then integrated on a time basis to calculate two areas $S_1$ and $S_2$ each corresponding to a ¼ period, in step 74. In step 75, it is determined whether $S_1 > S_2$ (or $S_2 > S_1$)0. If $S_1 > S_2$ (or $S_2 > S_1$) is not satisfied in step 75, in other words, if it is determined that the two areas $S_1$ and $S_2$ coincide, the flow advances to step 71 through step 70, and the welding torch 5 is moved or the half period of weaving in accordance with the reference value. In this case, when the actual weld line 13 coincides with the instructed weld line and weaving of the welding torch 5 is correctly performed, the wave form of the arc current is symmetrical, and the two areas $S_1$ and $S_2$, each of which corresponds to a ¼ period and which are the current integration values of the right and left weaving, become equal to each other.

If $S_1 > S_2$ (or $S_2 > S_1$) in step 75, in other words, when it is determined that the area $S_{2b}$ is larger than an area $S_{1b}$, as shown in FIG. 5(b), the flow advances to step 76. In step 76, a correction area $S_{2c}$ is calculated by subtracting, from the larger area $S_{2b}$, an area corresponding to a predetermined time period $\alpha$ at the end period of the larger area $S_{2b}$, and the correction area $S_{2c}$ is compared with the smaller area $S_{1c}$. Note that, the correction area $S_{2c}$ is an area obtained by integration starting from a center time point $t_{3c}$ up to a time point $t_{2c}$, where the time point $t_{3c}$ is the center time point of a time period which is a difference obtained by subtracting the predetermined time period $\alpha$ from a time period corresponding to the half period of the weaving, and the smaller area $S_{1c}$ is an area obtained by integration starting from the time point $t_1$ up to the center time point $t_{3c}$. In this case, the correction area $S_{2c}$ is obtained by subtracting from the area $S_{2b}$, determined to be larger in step 75, the area corresponding to the predetermined time period $\alpha(S\alpha)$ at the end portion of the area $S_{2b}$, and is compared with the smaller area $S_{1c}$, for the following reasons. More specifically, with this procedure, a change in the arc current caused by a disturbance or the like is eliminated, and only a change in the arc current caused by a change in positional relationship between the welding torch 5 and the members 11 and 12 to be welded can be identified. Simultaneously, when the area corresponding only to the predetermined time period o is subtracted, the predetermined time period $\alpha(\alpha_1, \alpha_2)$ is deemed to correspond to an end portion of the area $S_{2c}$ ($S_1, S_2$), for the following reasons. More specifically, a change in the arc current caused by a disturbance or the like generally occurs at an end of an area. With this procedure, only a change in the arc current caused by a change in the positional relationship between the welding torch 5 and the members 11 and 12 to be welded can be identified.

In the above manner, if $S_1-S\alpha_1>S_2$ (or $S_2-S\alpha_2>S_1$ in step 76, the flow advances to step 77 to correct the reference value using the correction function, but if $S_1-S\alpha_1>S_2$ (or $S_2-S\alpha_2>S_1$) is not obtained in step 76, the flow advances to step 71 through step 70, and the welding torch 5 is moved for the half period of weaving in accordance with the reference value.

When the reference value is corrected using the correction function in step 77, the flow advances to step 78 to determine whether the end condition are satisfied. The end conditions of step 78 are the same as the end conditions of step 70. If YES in step 78, the processing of the correction of movement of the welding torch 5 is ended, but if NO in step 78, the flow advances to step 79.

In step 79, the welding torch 5 is moved for the half period of weaving in accordance with the correction value, and the flow advances to step 72. Note that the correction value is a value obtained by correcting the reference value using the correction function in step 77.

As described above in detail, the processing of the correction of movement of the welding torch is repeated every half period of weaving until YES is obtained in steps 70 and 78.

The correction function of step 77 will be described. The correction function is used to correct movement 0 of the welding torch when $S_1-S\alpha_1>S_2$ (or $S_2-S\alpha_2>S_1$) in step 76. With the correction function, the reference value, in accordance with which the welding torch is moved along the instructed weld line, is corrected. When the reference value is corrected and movement of the welding torch is compensated, the weaving operation of the next half period is corrected by the arc current caused by weaving of the preceding half period weaving.

A correction function preferably has a curve that has a leading edge which becomes more moderate as the difference between the two areas each corresponding to a ¼ period of the arc current (the difference between the current integration values of the right and left weaving) becomes larger. With such a correction function, when a difference between the current integration values of the right and left weaving is small and a deviation of the welding torch is small, and the welding torch can be corrected with a high sensitivity. Even when a difference between the current integration values of the right and left weaving is large and a deviation of the welding torch is large, an abrupt correction is not made and thus the welding torch does not move in a zigzag manner.

Various types of correction functions that satisfy these conditions are available, and one that satisfies an equation.

$$\Delta C_1 = (|S_{2c}/S_{1c}-1|)^{\frac{1}{2}} \times \Delta_1$$

(where $\Delta C_1$ is a correction amount and $\Delta_1$ is a correction constant), is most suitable.

This correction function can be mathematically processed comparatively easily and can be appropriately subjected to actual correction. Note that the two areas used in this correction function are not limited to the correction areas $S_{2c}$ and $S_{1c}$ processed in the predetermined manner in step 76 but can be the areas $S_1$ and $S_2$ ($S_{1b}$ and $S_{2b}$) calculated in step 74.

We claim:

1. A control apparatus for an automatic arc welding machine for automatically performing arc welding by weaving a welding torch along a weld line, using an arc sensor to detect an arc current caused by the weaving, and compensating movement of said welding torch, said control apparatus comprising:

an area calculating means for detecting the arc current at every half period of the welding, and integrating the arc current on a time basis to calculate two areas each corresponding to a ¼ period;

first area comparing discriminating means for comparing the two areas calculated by said area calculated means and for discriminating between a first area and a second area;

a second area comparing discriminating means for calculating a first correction area by subtracting a predetermined area from the first area discriminated by said first area comparing discrimination means, the predetermined area corresponding to a predetermined time period at an end portion of the first area, and for comparing the first correction with the second area discriminated by said first area comparing discriminating means; and movement compensating means for correcting a reference value by using a correction function to compensate for the movement of said welding torch when the first correction area is larger than the second area.

2. A control apparatus according to claim 1, wherein when the difference between the first correction area and the second area becomes larger, the correction function is moderated so that an abrupt correction is not made.

3. A control apparatus according to claim 2, wherein the first correction area is an area obtained by integration starting from a center time point of a time period which is a difference obtained by subtracting a predetermined time period at the end portion of the first area from a time period corresponding to a half period of the weaving, and the second area is an area obtained by integration up to the center time point of the time period which is the difference obtained by subtracting the predetermined time period at the end portion of the first area from the time period corresponding to the half period of the weaving.

4. A control apparatus according to claim 2, wherein the correction function is expressed by the following formula:

$$\Delta C_1 = (|S_{2c}/S_{1c}-1|)^{\frac{1}{2}} \times \Delta_1$$

wherein:
$\Delta c_1$ is a correction amount,
$S_{1c}$ is the first correction area,
$S_{2c}$ is the second area, and
$\Delta_1$ is a correction constant.

5. A control apparatus according to claim 1, wherein said area calculating means sets a minimum value of the detected arc current to zero and thereafter performs an integration on a time basis, thereby calculating the two areas each corresponding to a ¼ period.

6. A control apparatus for an automatic arc welding machine for automatically performing arc welding by weaving a welding torch along a weld line, using an arc sensor to detect an arc current caused by the weaving, and compensating movement of said welding torch, said control apparatus comprising:

area calculating means for detecting the arc current at every half period of the welding, and for integrating the arc current on a time basis to calculate two areas each corresponding to a ¼ period; and correction discriminating means for discriminating whether movement correction of said welding torch is needed, and when movement correction of said welding torch is needed, said correction discriminating means correcting a reference value in accordance with a moderated correction function curve as the difference between the two areas becomes larger so that no abrupt correction is determined therein compensating the movement of said welding torch, wherein the correction function is expressed by the following formula:

$$\Delta C_1 = (|S_{2c}/S_{1c} - 1|)^{\frac{1}{2}} \times \Delta 1$$

wherein:
$\Delta C_1$ is a correction amount,
$S_{1c}$ is the first correction area,
$S_{2c}$ is the second area, and
$\Delta 1$ is a correction constant.

* * * * *